United States Patent Office 3,579,434
Patented May 18, 1971

3,579,434
HYDROCRACKING OF NAPHTHA
Robert B. Smith, Pitman, and Barton W. Rope, Mullica Hill, N.J., assignors to Mobil Oil Corporation
No Drawing. Filed July 2, 1968, Ser. No. 741,867
Int. Cl. C10g *13/02, 13/10*
U.S. Cl. 208—111         2 Claims

ABSTRACT OF THE DISCLOSURE

A composition comprising a small quantity of palladium, generally between 0.05 and 5.0 weight percent palladium, deposited on a chelated hydrogen form of zeolite Y. A method of hydrocracking naphtha to LPG which comprises contacting a naphtha charge under hydrocracking conditions with the aforenoted catalyst.

BACKGROUND OF THE INVENTION

Field of the invention

This invention relates to a catalyst especially useful in the hydrocracking of naphtha to LPG products. This invention also relates to the hydrocracking of naphtha to LPG products whereby these LPG products are produced in high yields.

Description of the prior art

Many hydrocracking catalysts have been proposed. These catalysts generally comprise an inorganic oxide containing a hydrogenation component thereon. Naphthas have been known to be hydrocracked under conditions designated moderate and severe as discussed by A. M. Henke, B. J. Schmid and J. R. Strom, "Hydrocracking of Naphtha for LPG Production" AIChE meeting, Feb. 23, 1963, Houston, Tex.

Platinum impregnated zeolite catalyst such as platinum impregnated zeolite Y in the hydrogen form have been proposed for naphtha hydrocracking. While results of hydrocracking naphtha with such a catalyst provide LPG products, these products are not provided at especially high yields and the catalyst does not perform selectively for the production of LPG products. Thus, it has been a desideratum to provide a catalyst which functions selectively to provide high yields of LPG products from naphtha hydrocracking under moderate conditions.

SUMMARY OF THE INVENTION

Broadly, this invention contemplates a composition comprising between 0.05 and 5.0 weight percent palladium deposited on a chelated hydrogen form of zeolite Y.

In another embodiment, this invention contemplates a method for hydrocracking a naphtha charge which comprises contacting said naphtha charge under hydrocracking conditions with a catalyst comprising between 0.05 and 5.0 weight percent palladium deposited on a chelated hydrogen form of zeolite Y.

DESCRIPTION OF PREFERRED EMBODIMENTS

It has now been found that a full range naphtha such as a naphtha from Kuwait stock (Table I) can be converted in high yields to $C_3$ and $C_4$ hydrocarbons (LPG) by hydrocracking the naphtha over a catalyst comprising palladium on chelated hydrogen zeolite Y aluminosilicate. The palladium can be present in a small quantity, say, between about 0.05 and 5.0 weight percent. Generally, excellent hydrocracking results are obtained employing between about .2 and 2.5 weight percent palladium, especially about .5 weight percent palladium on the chelated HY aluminosilicate. The significant feature of this development resides in the fact that the activity and selectivity of this catalyst for the production of $C_3$ and $C_4$ products are markedly superior to results obtained employing other hydrocracking catalysts containing hydrogenation components thereon in substantially greater quantities. Thus, it has been found that the catalyst of the present invention containing about 0.5 weight percent palladium provides substantially superior naphtha hydrocracking to LPG products when compared with a commercially available silica-alumina catalyst containing 2.5 weight percent platinum. Additionally, the catalyst at the 0.5 weight percent palladium level provides superior results to a chelated hydrogen form of zeolite Y containing 1 weight percent platinum impregnated thereon. These results are obtained by hydrocracking under moderate conditions as no particular process parameters need be employed for hydrocracking naphtha employing the catalyst of the present invention.

Employing the catalyst of this invention, naphtha can be hydrocracked at temperatures between 400° F. and 825° F. using molar ratios of hydrogen to hydrocarbon charge in the range between 2 and 80. The pressure will vary between 10 and 2000 p.s.i.g. and the liquid hourly space velocity can be between 0.1 and 10.

The catalyst of the present invention is prepared by preparing a zeolite Y composition, chelating it and ion exchanging the same into its hydrogen form. Thereafter, the chelated HY composition is impregnated with palladium. Zeolite Y in its sodium form can be prepared according to the method of U.S.P. 3,130,007. The zeolite Y can be chelated employing any suitable chelating agent such as ethylenediaminetetraacetate, citric acid, 8-hydroxyquinoline, diethylenetriaminepentaacetic acid, and N-hydroxyethylenediaminetriacetic acid.

The zeolite is chelated to such an extent as to effect removal of at least 2 percent and preferably at least 10 percent of the aluminum from the zeolite Y. No more than about 50 percent of the total aluminum should be removed.

The zeolite is thereafter converted to a hydrogen form by any suitable means such as by exchanging the cations with an ammonium salt to convert it into an ammonium form and thereafter heating it at a temperature of about 250° C. causing evolution of ammonia and conversion of the zeolite to the hydrogen form. Other means for preparing hydrogen zeolite Y are known in the art and these are generally suitable in preparing the catalyst.

The zeolite in its hydrogen form is thereafter treated to incorporate palladium into the structure. The palladium can be deposited on the zeolite by impregnation, exchange or any other suitable means. Suitable impregnating agents include palladous ammine chloride prepared by mixing appropriate amounts of palladium chloride with ammonium hydroxide, palladium nitrate, palladium sulfate and palladium iodide. The impregnating agent can be in the form of an aqueous solution or in the form of an organic solution. In some instances, it is desirable to employ a solvent whose molecules are incapable of entering the pores of the zeolite.

When the catalyst has been impregnated with the impregnating agent, it is dried and calcined at a temperature of between 500° F. and 2000° F. for between 2 and 48 hours.

In order to more fully illustrate the nature of the invention and the manner of practicing the same, the following examples are presented:

EXAMPLE I

A palladium on chelated hydrogen form of zeolite Y was made by chelating 2275 grams sodium form of zeolite Y with 442 grams sodium ethylenediaminetetraacetate in 4420 grams of water at 200° F. for 24 hours. The chelated zeolite was thereafter exchanged with an aqueous solution of 10 percent by weight ammonium chloride thereby exchanging a major amount of the sodium cations for ammonium cations. The ammonium form was impregnated with palladium nitrate from a solution of the same in dimethyl sulfoxide. Impregnation was achieved by contacting the ammonium form for 24 hours at 150° C. while stirring with Pd $(NO_3)_2$ in a dimethyl sulfoxide solution, followed by filtration and wash with dimethylsulfoxide at 150° C. Thereafter, it was air dried for 18 hours at 230° F., pelleted and sized 14 to 25 (Tyler) mesh and then calcined at 1000° F. for 10 hours until it was substantially free of moisture.

Resultant catalyst was employed for hydrocracking Kuwait full-range naphtha which was carried out in a continuous unit at 2000 p.s.i. hydrogen pressure employing approximately 7500 s.c.f. of hydrogen per barrel of naphtha on a once-through basis. In the hydrocracking runs reported below, each run was followed by an overnight period of catalyst regeneration with hydrogen at about 950° F. Conditions of temperature and space velocity are given in the tables below which compares the catalyst of the present invention, designated Catalyst A, with a commercially available silica-alumina catalyst containing 2.5 weight percent platinum, designated Catalyst B, and a chelated hydrogen form of zeolite Y containing 1 weight percent platinum, designated Catalyst C. Catalyst C was chelated in the same manner as Catalyst A was chelated.

TABLE I

Properties of Kuwait naphtha

| | |
|---|---|
| Gravity, API | 60.5 |
| Aromatics, vol. percent | 9.7 |
| Indanes and tetralins, vol. percent | 1.1 |
| Olefins, vol. percent | .4 |
| Saturates | 88.8 |
| Composition, vol. percent: | |
| Isobutane | 0.1 |
| n-Butane | 1.6 |
| Isopentane | 3.2 |
| n-Pentane | 5.4 |
| $C_6^+$ | 89.7 |
| Distillation: | |
| IBP, ° F. | 109 |
| 10% | 164 |
| 50% | 284 |
| 90% | 395 |
| EP | 420 |

In all of the hydrocracking runs, the gas collecting and sampling technique led to the loss of hydrogen from the light gas resulting in an analysis very rich in hydrocarbons. The light gas analyses were therefore adjusted to give a 100% carbon balance between the carbon in the naphtha charged and the carbon in the sum of products.

From the foregoing, it is seen that the catalyst of the present invention under the moderate hydrocracking conditions provides substantially greater yields of LPG products than either Catalyst B or Catalyst C. In fact, the volume percent $C_3$ and $C_4$ (LPG) provided by the catalyst of the present invention is multiples of the volume percent of these products provided by Catalysts B and C, notwithstanding that Catalyst C contains twice as much weight percent hydrogenation component and Catalyst B contains five times the weight percent hydrogenation component. Thus, it appears that the present catalyst is markedly superior to either of these catalysts for the production of LPG products by hydrocracking naphtha.

The terms and expressions used herein have been used as terms of description and not of expressions as there is no intention in the use of such terms and expressions of excluding any equivalent, or portions thereof, as many modifications and departures are contemplated within the scope of the invention claimed.

What is claimed is:

1. A method of hydrocracking naphtha to LPG products which comprises contacting said naphtha under hydrocracking conditions comprising a temperature between 400° F. and 825° F., a molar ratio of hydrogen to hydrocarbon between 2 and 80, a pressure between 10 and 2000 p.s.i.g. and a liquid hourly space velocity between 0.1 and 10 with a catalyst comprising an amount of about .5 weight percent palladium deposited on a hydrogen form of zeolite Y which has undergone previous chelation to effect removal of at least 2 percent but not more than 50 percent of aluminum from said zeolite Y.

2. A method of hydrocracking naphtha to LPG products which comprises contacting said naphtha under hydrocracking conditions comprising a temperature between 400° F. and 825° F., a molar ratio of hydrogen to hydrocarbon between 2 and 80, a pressure between 10 and 2000 p.s.i.g. and a liquid hourly space velocity between 0.1 and 10 with a catalyst comprising between about .25 and 2.5 weight percent palladium deposited on a hydrogen form of zeolite Y which has undergone previous chelation to effect removal of at least 2 percent but not more than 50 percent of aluminum from said zeolite Y.

TABLE II.—HYDROCRACKING KUWAIT NAPHTHA

| | 0.49% Pd on HY (chelated), Catalyst A | | | 2.6% Pt on 46 Al Si/Al, Catalyst B | | | | 1% Pt on HY (chelated), Catalyst C | | |
|---|---|---|---|---|---|---|---|---|---|---|
| Example No | 1 | 2 | 3 | 4 | 5 | 6 | 7 | 8 | 9 | 10 |
| P.s.i. | 2,000 | 2,000 | 2,000 | 2,000 | 2,000 | 2,000 | 2,000 | 2,000 | 2,000 | 2,000 |
| $H_2$/oil, s.c.f.b. | 7,500 | 7,500 | 7,500 | 7,500 | 7,500 | 7,500 | 7,500 | 7,500 | 7,500 | 7,500 |
| LHSV | 4.25 | 4.24 | 2.17 | 2.16 | 2.16 | 2.17 | 4.25 | 4.25 | 4.24 | 2.17 |
| Catalyst temp., ° F. | 639 | 728 | 674 | 596 | 658 | 729 | 753 | 494 | 637 | 667 |
| Conv. (100-$C_5^+$), vol. percent | 39.1 | 64.0 | 69.6 | 0.8 | 1.6 | 11.2 | 8.8 | 0.6 | 15.0 | 53.2 |
| $C_1+C_2$, wt. percent | 0.2 | 2.3 | 1.5 | | | 0.2 | 0.6 | | | 0.1 |
| Propane, vol. percent | 18.3 | 40.9 | 40.3 | 0.3 | 1.0 | 7.5 | 4.8 | 0.4 | 6.6 | 16.8 |
| Iso-butane, vol. percent | 34.5 | 30.3 | 39.0 | 0.8 | 2.8 | 11.2 | 8.0 | 0.9 | 16.8 | 29.1 |
| n-Butane, vol. percent | 11.2 | 23.4 | 25.4 | 0.9 | 1.8 | 7.5 | 6.5 | 1.1 | 8.3 | 13.9 |
| $C_5$s, vol. percent | 27.0 | 28.3 | 17.3 | 7.4 | 9.4 | 19.2 | 17.5 | 6.8 | 21.3 | 11.0 |
| Hexanes, vol. percent | 3.6 | 7.7 | 13.0 | 0.6 | 14.0 | 2.2 | 1.9 | 1.0 | 2.0 | 2.1 |
| Residue, vol. percent | 30.3 | | 0.1 | 91.2 | 75.0 | 67.4 | 71.8 | 91.6 | 61.7 | 33.7 |
| $C_5^+$, vol. percent | 60.9 | 36.0 | 30.4 | 99.2 | 98.4 | 88.8 | 91.2 | 99.4 | 85.0 | 46.8 |

References Cited

UNITED STATES PATENTS

| | | | |
|---|---|---|---|
| 3,265,610 | 8/1966 | Lavergne et al. | 208—111 |
| 3,385,782 | 5/1968 | Buss | 208—111 |
| 3,442,795 | 5/1969 | Kerr et al. | 208—120 |

DELBERT E. GANTZ, Primary Examiner

R. M. BRUSKIN, Assistant Examiner

U.S. Cl. X.R.

252—455Z